March 31, 1931.  S. S. SCOTT ET AL  1,798,278
FENDER FOR VEHICLES
Filed April 30, 1917
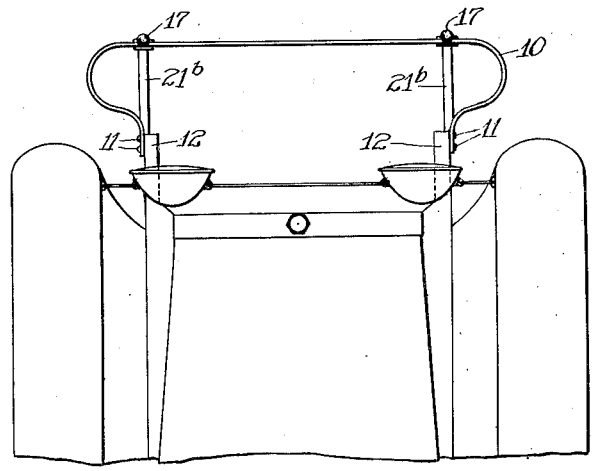
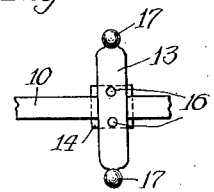
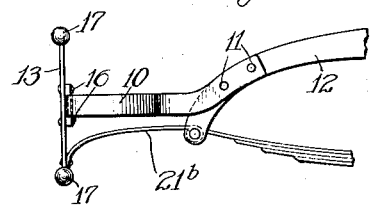
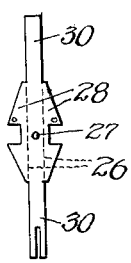
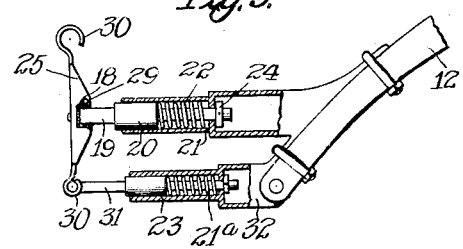
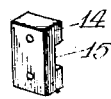
INVENTORS.
Semple S. Scott and
Edgar A. Turner
by Carpenter
ATTORNEY Patented Mar. 31, 1931

1,798,278

UNITED STATES PATENT OFFICE

SEMPLE S. SCOTT AND EDGAR A. TURNER, OF KENILWORTH, ILLINOIS

FENDER FOR VEHICLES

Application filed April 30, 1917. Serial No. 165,528.

This invention relates to improvements in fenders for vehicles, more particularly those of the type in which a horizontal member is arranged either in front of or behind, or both in front of and behind, the vehicle for the prevention of injury if it runs into an obstacle, or is run into by another vehicle. Such fenders are customarily mounted at the ends of the vehicle frame, and for this and other reasons the height of the fender above the road varies with the type of vehicle. With a vehicle having a low hung frame the fender is usually lower than in the case of vehicles having higher frames as the fender is ordinarily mounted on the frame and not on portions of the vehicle carried thereby. Now when two vehicles collide the two fenders should preferably contact with each other, but we have found that frequently one fender overlaps the other owing to one fender being considerably lower than the other.

The principal objects of our present invention are to provide means whereby the fender on a vehicle will engage the fenders on another vehicle substantially irrespective of their height above the road; to provide means whereby overlapping of the fenders of two vehicles is prevented; to provide improved means for supporting fenders, and generally, to improve the construction of fenders for automobiles or other vehicles.

In attaining these and other objects and advantages to be hereinafter described, we have provided a construction two forms of which are illustrated in the accompanying drawings, in which:

Figure 1 is a plan view of the front of an automobile with our improved fender attached thereto;

Figure 2 is a front elevation of a part of our improved fender;

Figure 3 is a side elevation of the same part of our improved fender illustrating the connection of the fender to the frame;

Figure 4 is a plan view of a part of a further form of fender;

Figure 5 is a side elevation of a further form of fender; and

Figure 6 is a detail of the form of fender shown in Figures 1 to 3, respectively.

In the drawings we have shown in Figures 1 to 3 the application of our invention to an automobile having a fender of the spring type comprising a spring 10, riveted or bolted at 11 to the ends 12 of the frame, as shown more particularly in Figure 3. Since the height of the fender 10 above the ground depends largely upon the particular construction of the car, we have provided extensions on the fender which preferably extend both upwardly and downwardly therefrom so that the fender will engage the fender of any other car, even though that fender may be higher or lower than the fender 10. Preferably two extensions are used, one adjacent each side of the fender so that engagement will take place whichever side of the car collides with another car. In the form of construction shown these extensions consist of plates 13 which may be of spring steel clamped to the fender. Each plate 13 is clamped to the spring 10 by means of the block 14 shown in Figure 6. This block 14 has a recessed part 15 adapted to receive the fender 10. By means of bolts 16 passing through the block 14 and plate 13 the parts are held securely together, and tilting of the plate 13 relatively to the fender 10 is prevented.

In order to avoid possible hooking of other vehicles, tearing of clothes, etc. the upper and lower ends of plates 13 are preferably provided with knobs 17.

In Figures 4 and 5 we have illustrated our invention as applied to a fender of channel-shaped cross-section 18. This channel-shaped member 18 is supported by members 19 attached to the ends 12 of the frame.

For preventing the fender 18 interlocking other fenders the members 25 are attached thereto. These members are formed from a sheet metal stamping of the form shown in Figure 4. After the metal has been stamped it is folded on the lines 26 and then attached to the end of the member 19 by means of a stud bolt 27. The side wings 28 serve to prevent tilting of the member 25 relatively to the fender 18. In order to support the members 25 still further a connection 23, comprising in the type of device shown in Figure 5 reciprocating member 31 slidably mounted within a housing 32, may be used connecting one or other, preferably the lower end of the member 25 to the frame and thereby act as a brace very effectively preventing tilting. To compensate for movement of the fender 10 upon compression, we employ within the brace 23 a compression spring 21a. In the type of device shown in Figures 1 to 3 we may employ for the purpose stated a bent flat spring 21b.

The side wings 28 may be connected by means of a bolt 29 in order to prevent their separating. An extension 30 is provided which can be curled around, as shown in Figure 5, to perform the same function as the knob 17 in the form of construction shown in Figures 1 to 3.

Having thus described our invention and illustrated its use, what we claim as new and desire to secure by Letters Patent is:—

1. A device of the character described comprising, in combination, a substantially horizontal member extending transversely of a vehicle, and a second member mounted on said first member at an angle thereto, the said second member, including a channel formed member recessed for the reception of said horizontal member and affixed thereto, whereby relative movement of the two members of the device is prevented.

2. A device of the character described comprising, in combination, a vehicle frame, a substantially horizontal member extending transversely of the vehicle, and a substantially vertical member adapted to coact with said horizontal member, both vertical and horizontal members being carried by said frame, the said vertical member including a channel formed member recessed for the reception of said horizontal member and affixed thereto, whereby relative movement of the vertical and horizontal members of the device is prevented.

3. A device of the character described comprising a substantially horizontal member extending transversely of a vehicle having a substantially vertically extending portion, the said vertically extending portion including a channel formed member recessed for the reception of said horizontal member and affixed thereto, whereby relative movement of the vertical and horizontal portions of the device is prevented.

4. A device of the character described comprising a substantially horizontal member extending transversely of a vehicle having upwardly and downwardly extending portions, the said upwardly and downwardly extending portions including a channel formed member recessed for the reception of said horizontal member and affixed thereto, whereby relative movement of the vertical and horizontal portions of the device is prevented.

5. A guard device for preventing automobile fenders from interlocking, comprising in combination with a fender a channel formed member recessed for the reception of the fender, and means whereby relative movement of the guard device and the fender is prevented.

6. A device of the character described comprising a substantially horizontal member extending transversely of a vehicle having a substantially vertically extending portion, said portion having a stop thereon whereby vertical movement of another fender contacting therewith is limited and interlocking of the two fenders is prevented, the said vertically extending portion including a channel formed member recessed for the reception of said horizontal member and affixed thereto, whereby relative movement of the vertical and horizontal portions of the device is prevented.

7. A device of the character described comprising, in combination, a substantially horizontal member extending transversely of a vehicle, and a second member mounted on said first member at an angle thereto, and means for preventing said second member tilting relatively to said horizontal member, the said second member, including a channel formed member recessed for the reception of said horizontal member and affixed thereto, whereby relative movement of the two members of the device is prevented.

8. A guard device for preventing automobile fenders from interlocking, comprising a vertical member provided with a plurality of wings, spaced apart for the reception of the fender and adapted to abut thereagainst, whereby relative movement of the guard device and the fender is prevented.

9. A vehicle bumper comprising a horizontally extending bumper bar, vertical guards extending above and depending below said bumper bar and secured thereto and supported thereby in spaced apart relation, and yieldable supporting members connecting said guards to the vehicle forming a resilient support for the guards and bumper bar.

10. In an automobile bumper, a horizontal substantially rigid bumper bar forming a contact surface defined by the length and width of said bar, means for increasing the effective contact area of said bar comprising substantially vertically disposed spaced rigid members on the bar extending above and below the horizontal plane thereof, the intermediate portion of said bar remaining as a contact surface, and auxiliary means for yieldingly mounting said bar on a vehicle.

11. In an automobile bumper, a horizontal substantially rigid bumper bar forming a contact surface defined by the length and width of said bar, means for increasing the effective contact area of said surface comprising substantially vertically disposed rigid members on said bumper bar and extending above and below the horizontal plane thereof, and means for removably and adjustably clamping said vertical bars in a desired position upon said horizontal bar.

In witness whereof we have hereunto signed our names.

SEMPLE S. SCOTT.
EDGAR A. TURNER.